(12) United States Patent
Takamoto et al.

(10) Patent No.: US 7,062,980 B2
(45) Date of Patent: Jun. 20, 2006

(54) BICYCLE SHIFT CONTROL DEVICE WITH DECREASED STRESS DURING SHIFTING

(75) Inventors: Ryuichiro Takamoto, Sakai (JP); Masato Tanida, Kashihara (JP)

(73) Assignee: Shimano, Inc., Sakai (JP)

( * ) Notice: Subject to any disclaimer, the term of this patent is extended or adjusted under 35 U.S.C. 154(b) by 137 days.

(21) Appl. No.: 10/708,497

(22) Filed: Mar. 8, 2004

(65) Prior Publication Data

US 2004/0206188 A1 Oct. 21, 2004

(30) Foreign Application Priority Data

Mar. 11, 2003 (JP) .............................. 2003-065702

(51) Int. Cl.
*F16H 1/20* (2006.01)
(52) U.S. Cl. .................................. 73/862.31
(58) Field of Classification Search ............. 73/862.08, 73/862.13, 862.191, 862.29, 862.31, 862.321, 73/862.322
See application file for complete search history.

(56) References Cited

U.S. PATENT DOCUMENTS

| 3,182,778 | A | | 5/1965 | Dröschel |
| 5,027,303 | A | * | 6/1991 | Witte .......................... 702/44 |
| 5,035,159 | A | | 7/1991 | Shibayama |
| 6,192,300 | B1 | * | 2/2001 | Watarai et al. .................. 701/1 |
| 6,354,980 | B1 | * | 3/2002 | Grant .......................... 475/266 |
| 6,367,833 | B1 | * | 4/2002 | Horiuchi ...................... 280/260 |
| 6,722,220 | B1 | * | 4/2004 | Takeda ......................... 74/335 |
| 2002/0089143 | A1 | * | 7/2002 | Horiuchi ...................... 280/261 |
| 2002/0094906 | A1 | * | 7/2002 | Jordan ......................... 475/254 |

FOREIGN PATENT DOCUMENTS

| EP | 543453 A1 | 5/1993 |
| EP | 1129932 A2 | 9/2001 |
| JP | 3107317 B2 | 3/1993 |
| JP | 9-123978 A | 5/1997 |
| JP | 10-194185 A | 7/1998 |
| JP | 11-147494 A | 6/1999 |
| JP | 2001-10581 A | 1/2001 |

* cited by examiner

*Primary Examiner*—Max Noori
(74) *Attorney, Agent, or Firm*—James A. Deland

(57) ABSTRACT

A control apparatus is provided that facilitates the operation of a component that is subjected to stress from a stress-inducing component. The apparatus comprises an operation sensing unit that senses when the component should be operated; a stress reducing unit that provides a signal for reducing an amount of stress applied to the component from the stress-inducing component when the operating sensing unit senses that the component should be operated; and a control unit that provides a signal for operating the component a predetermined time after the stress reducing unit provides the signal.

21 Claims, 8 Drawing Sheets

|  | HIGH TORQUE MODE (km/h) | NORMAL MODE (km/h) |
|---|---|---|
| 1st speed to 2nd speed | 14 | 10 |
| 2nd speed to 3rd speed | 18.5 | 16 |
| 3rd speed to 2nd speed | 16 | 12.5 |
| 2nd speed to 1st speed | 12 | 6.5 |

BICYCLE SHIFT CONTROL DEVICE WITH DECREASED STRESS DURING SHIFTING

BACKGROUND OF INVENTION

The present invention is directed to wheeled vehicles and, more particularly, to an apparatus for controlling the operation of a bicycle transmission.

Bicycles have transmissions that may be manually operated by the rider or automatically operated based on bicycle speed or some other parameter. Japanese Unexamined Patent Application (Kokai) 2001-10581 discloses an automatic transmission for a motorized bicycle wherein bicycle speed and pedal power are sensed. The transmission in that bicycle is housed within the rear wheel hub, and a controller selects the optimal transmission gear based on bicycle speed. The actual shifting of the transmission to the desired gear is timed to correspond to instances of decreased pedal power because smooth shifting cannot be accomplished when the transmission is subjected to large loads. Such timing is somewhat difficult in motor-assisted bicycles that tend to exert such large loads continuously. Furthermore, such systems require two-way communications between the controller and the motor and transmission, thus making for an extremely complicated control process. Such problems extend to both manual and automatic electronic transmissions.

SUMMARY OF INVENTION

The present invention is directed to various features of an electronically controlled component. In one embodiment, a control apparatus is provided that facilitates the operation of a component that is subjected to stress from a stress-inducing component. The apparatus comprises an operation sensing unit that senses when the component should be operated; a stress reducing unit that provides a signal for reducing an amount of stress applied to the component from the stress-inducing component when the operating sensing unit senses that the component should be operated; and a control unit that provides a signal for operating the component a predetermined time after the stress reducing unit provides the signal. Additional inventive features will become apparent from the description below, and such features alone or in combination with the above features may form the basis of further inventions as recited in the claims and their equivalents.

DETAILED DESCRIPTION

Figure 1:
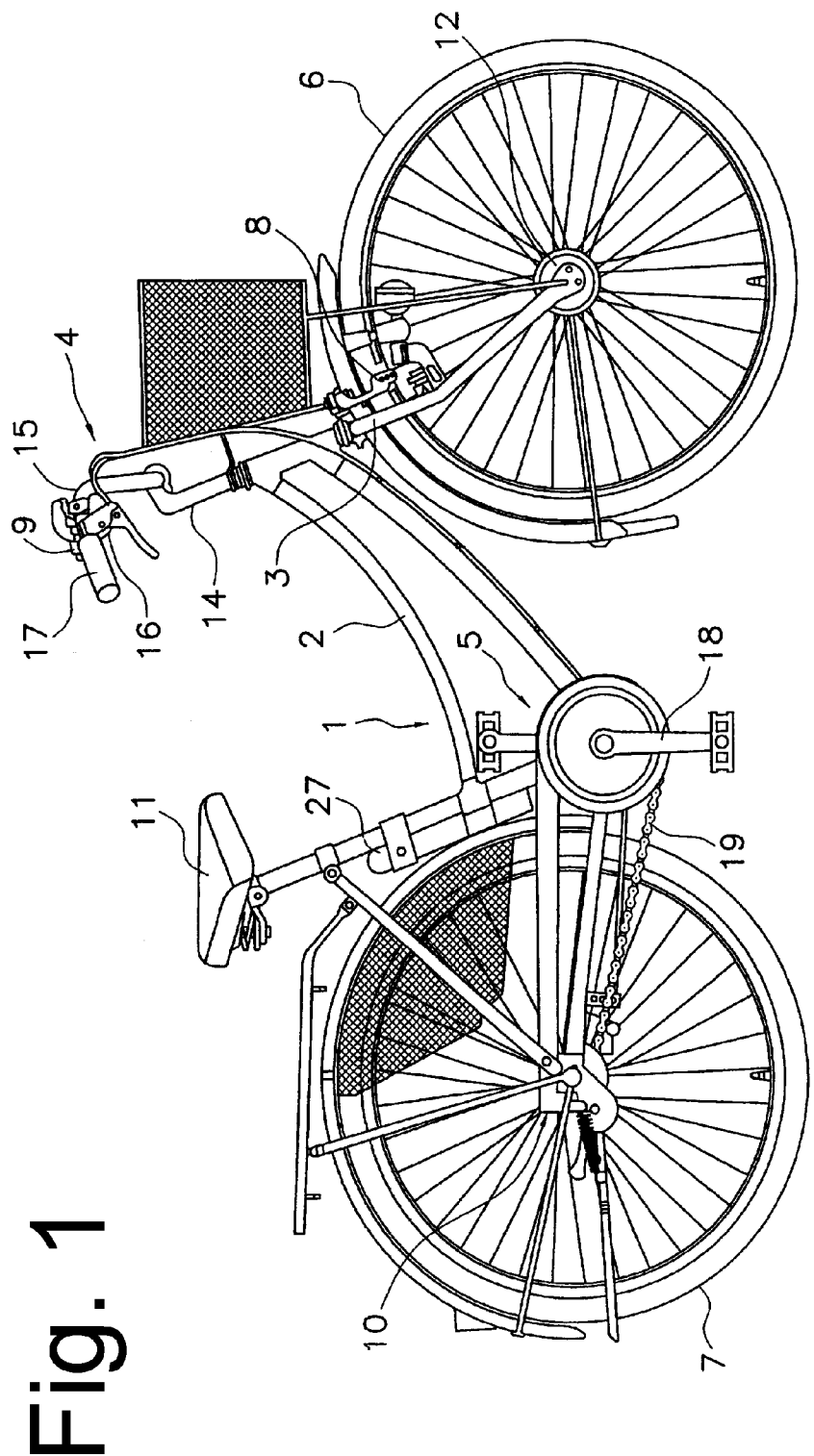
FIG. 1 is a side view of a particular embodiment of a bicycle.

FIG. 1 is a side view of a particular embodiment of a vehicle such as a bicycle 1. Bicycle 1 is a recreational bicycle comprising a double-loop frame body 2 formed from welded tubes, a front fork 3 rotatably mounted to frame body 2, a handlebar assembly 4, a drive component 5, a front wheel 6 on which is mounted a dynamo hub 12, a rear wheel 7 on which is mounted an internal shifting hub 10, front and rear brakes 8 (only front brake 8 is shown), a saddle 11, a shift controller 9 for manually controlling the operation of internal shifting hub 10, and a power supply 27.

Dynamo hub 12 is an alternating current (AC) generator that may have, for example, 28 poles for emitting AC signals in response to the rotation of front wheel 6. Such AC signals may be shaped by a waveform shaping circuit in a known manner and used to calculate bicycle speed. In that case, dynamo hub 12 also functions as a running condition sensing unit. Power supply 27 may be a primary battery such as a dry cell, a secondary battery such as a lithium hydrogen cell, or some other power source, and it supplies operating power to various electrical components discussed below.

Handlebar assembly 4 comprises a handle stem 14 and a handlebar 15, wherein handle stem 14 is fastened to the upper part of front fork 3, and handlebar 15 is fastened to handle stem 14. Brake levers 16, for operating the respective front and rear brakes 8, and grips 17 are mounted on both ends of handlebar 15. In this embodiment, shift controller 9 is integrated with the right-side brake lever 16.

Figure 3:
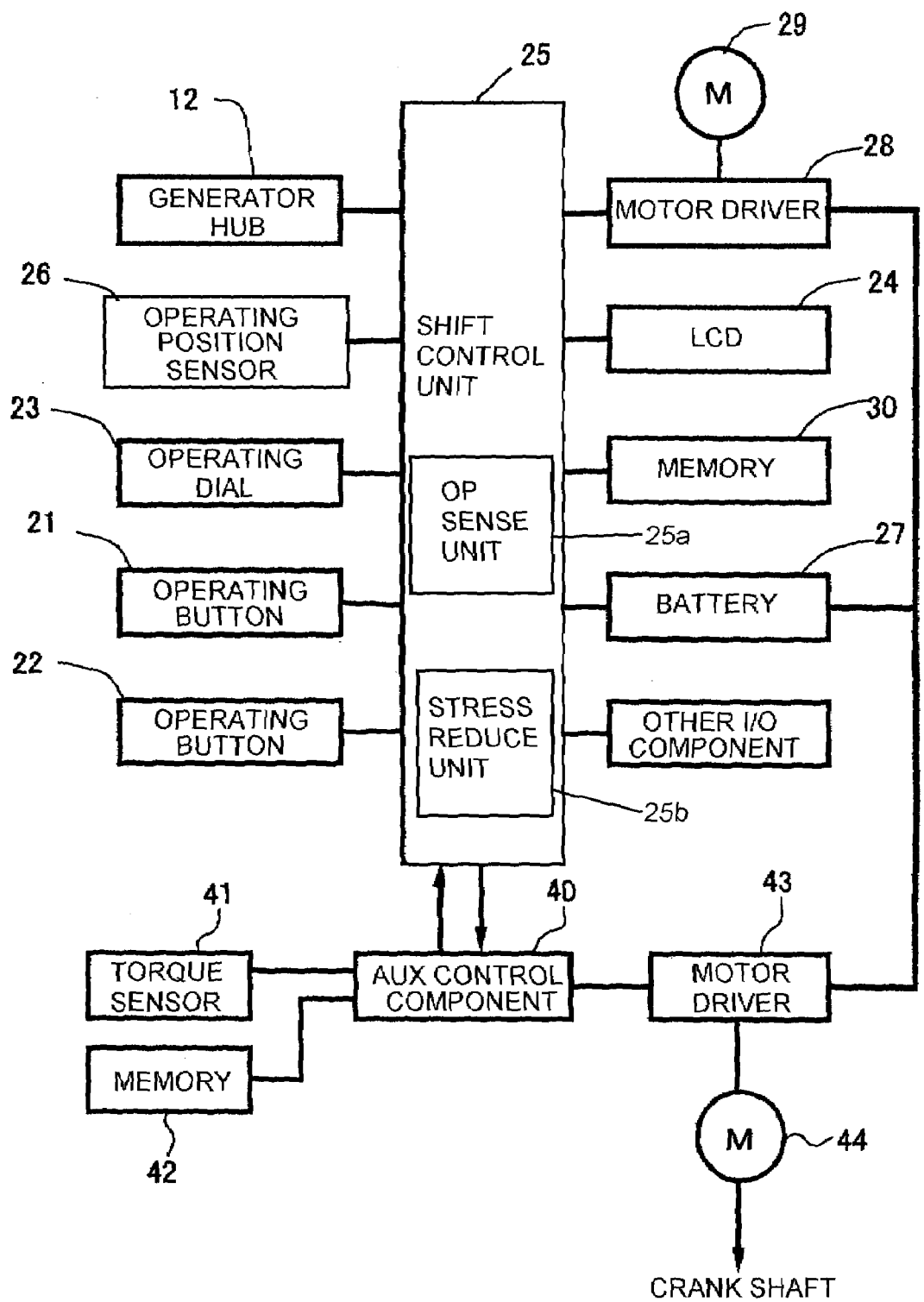
FIG. 3 is a schematic block diagram of a particular embodiment of a control system.

Drive component 5 comprises a crank 18 and a chain 19, wherein crank 18 includes a sprocket and is rotatably mounted on the lower part (bottom bracket component) of frame body 2. Chain 19 engages the sprocket on crank 18 and a sprocket that drives internal shifting hub 10. Internal shifting hub 10 is capable of producing three speeds and a locking position, wherein the three speeds and the locking position may be manually selected by shift controller 9 and effected by a shift motor 29 (FIG. 3). Auxiliary power is applied to crank 18 by an auxiliary motor 44 in a known manner to assist pedaling of the bicycle.

Figure 2:
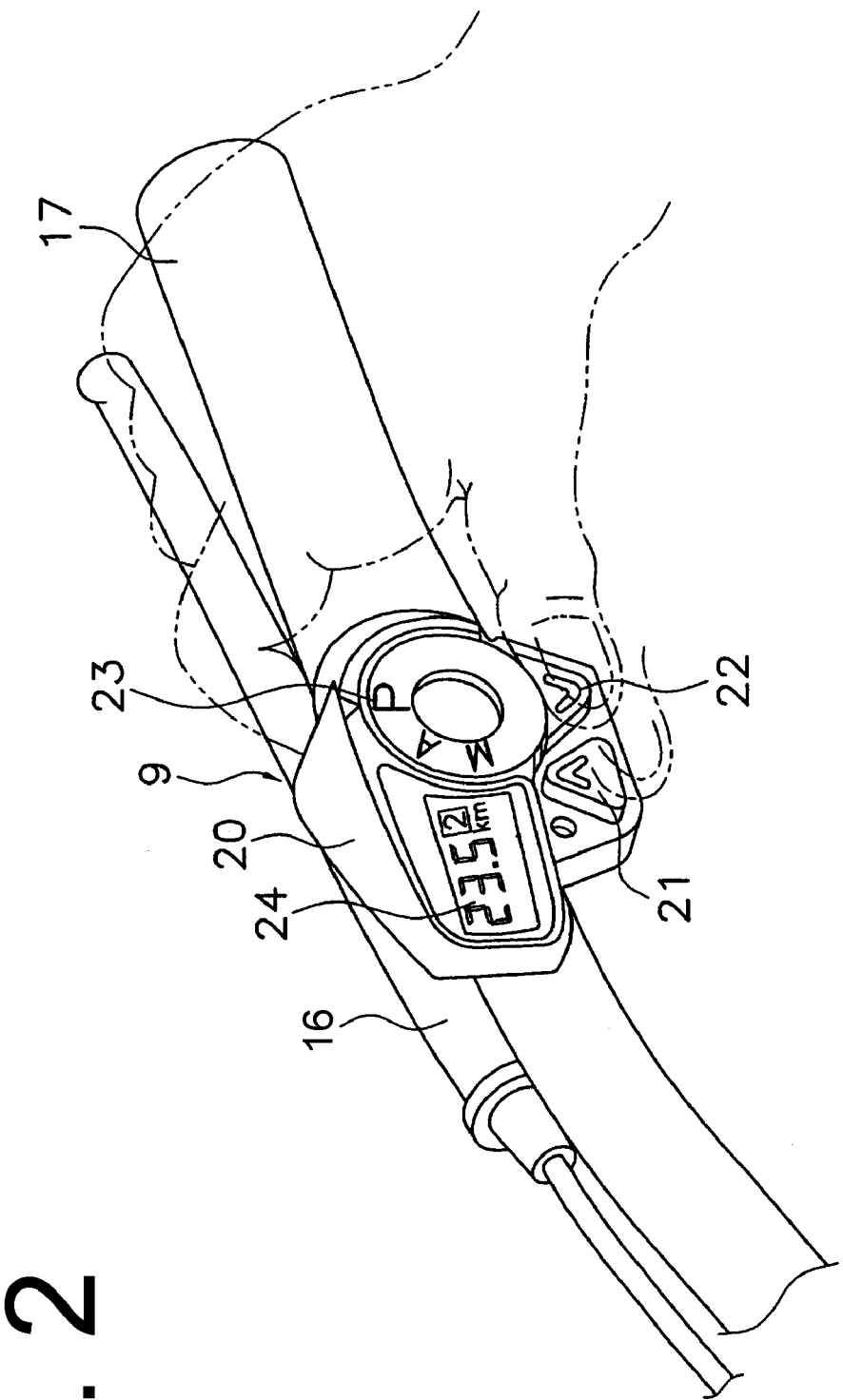
FIG. 2 is a closer view of a particular embodiment of a handlebar mounted control component.

As shown in FIG. 2, shift controller 9 comprises a housing 20 that is integrally formed with the right side brake lever 16, two operating buttons 21 and 22 in the form of triangular pushbuttons disposed next to each other on the lower part of housing 20, an operating dial 23 disposed above operating buttons 21 and 22, and a liquid crystal display 24 disposed to the left of operating dial 23. The operating button 21 on the left side is for manually shifting from a lower speed to a higher speed, and the operating button 22 on the right side is for manually shifting from a higher speed to a lower speed. Operating dial 23 is used for switching between a manual shifting mode (M), an automatic shifting mode (A), and a parking mode (P) using three detent positions. A shift control unit 25 (FIG. 3) is disposed within housing 20.

When operating dial 23 is set to automatic shifting mode (A), internal shifting hub 10 is automatically shifted based on speed signals from dynamo hub 12 and a bicycle condition sensing unit such as a pedal torque sensor 41 (FIG. 3). When operating dial 23 is set to manual shifting mode (M), internal shifting hub 10 is shifted to a desired speed through the manipulation of the operating buttons 21 and 22. In both modes, liquid crystal display 24 displays the current travel speed and the current transmission gear. When operating dial 23 is set to parking mode (P), internal shifting hub 10 is locked to restrict the rotation of rear wheel 7.

FIG. 3 is a schematic block diagram of a particular embodiment of an electronic control apparatus for controlling the operation of internal shifting hub 10. Shift control unit 25 comprises a microcomputer having a CPU, RAM, ROM, and I/O interface. Shift control unit 25 also comprises an operation sensing unit 25a and a stress reducing unit 25b that are programmed to function in a manner described below. Operation sensing unit 25a and stress reducing unit 25b may comprise software, hardware or firmware as appropriate. Shift control unit 25 is operatively coupled to dynamo hub 12 for receiving the speed signals mentioned above; to an operating position sensor 26 comprising a potentiometer or the like for sensing the operating position of internal shifting hub 10; to the operating dial 23, the operating buttons 21 and 22 and liquid crystal display 24; to power supply 27; to a motor driver 28 that operates shift motor 29 for changing the speeds of internal shifting hub 29 and placing internal shifting hub in the parking position in response to the operation of operating dial 23 and the operating buttons 21 and 22; to a memory 30, and to other I/O components.

Shift controller 9 also comprises an auxiliary control unit 40 for controlling the supply of auxiliary power to assist pedaling of the bicycle. Auxiliary control unit 40 comprises a microcomputer having a CPU, RAM, ROM, and I/O interfaces similar to shift control unit 25, and portions of operation sensing unit 25a and stress reducing unit 25b may be distributed within auxiliary control unit 40. Auxiliary control unit 40 is bidirectionally coupled to shift control unit 25. Auxiliary control unit 40 also is coupled to a torque sensor 41 for sensing pedaling torque, to a memory 42, to a motor driver 43, and to an auxiliary motor 44 that assists rotation of crank 18 in a known manner. Motor driver 43 and auxiliary motor 44 receive operating power from power supply 27.

Figures 4, 5:
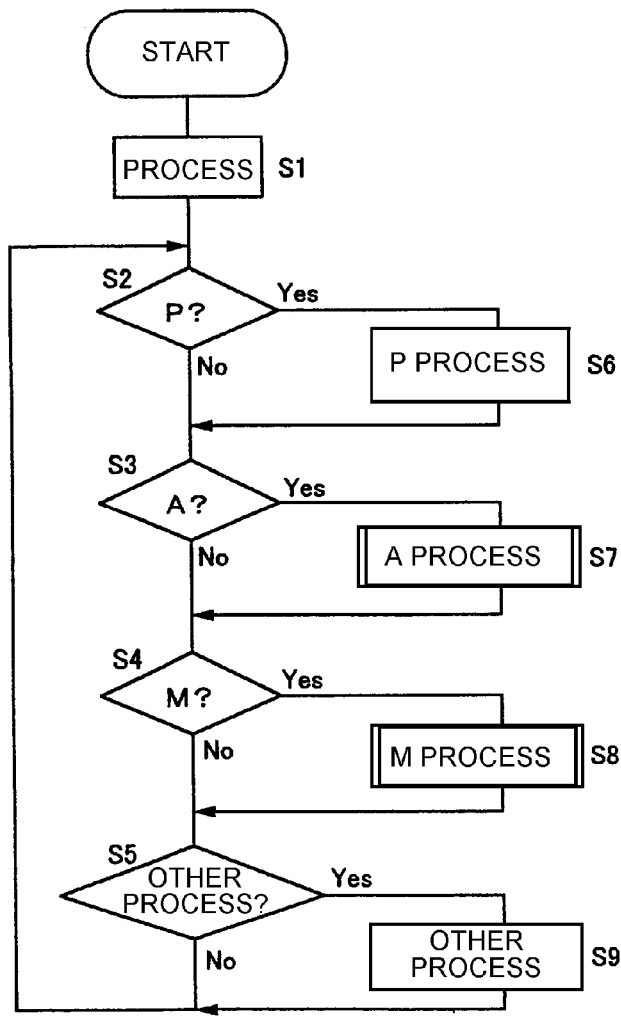
FIG. 4 is a table illustrating a particular embodiment of shift threshold values.
FIG. 5 is a flow chart of a particular embodiment of a main routine.

Memory 30 may comprise a rewritable nonvolatile memory such as an EEPROM, and it is used for storing programming code and various types of data such as the tire diameter used to calculate the bicycle speed and shift threshold values that indicate the speeds at which internal shifting hub 10 is shifted. FIG. 4 is a table illustrating a particular embodiment of upshift and downshift threshold values that may be stored in memory 30 and used to control automatic shifting depending on bicycle speed and pedal power (e.g., torque). In this embodiment, separate tables are provided for normal torque and high torque modes of operation. More specifically, shift control unit 25 uses the speed threshold values for the normal torque mode to determine when to operate shift motor 29 when pedal torque is below a certain value, and shift control unit 25 uses the speed threshold values for the high torque mode to determine when to operate shift motor 29 when pedal torque is at or above a certain value.

FIG. 5 is a flow chart of a particular embodiment of a main routine performed by shift control unit 25. The power is turned on for initialization in Step S1. Then, it is determined in a Step S2 whether or not operating dial 23 is set to parking mode (P). If so, then a parking process is performed in a Step S6. In that process, operating buttons 21 and 22 may be manipulated to register a code used to release a locked state of internal shifting hub 10, after which motor 29 is operated to move internal shifting hub 10 into the locked position. If internal shifting hub 10 already is in a locked state, operating buttons 21 and 22 may be manipulated to input the previously registered code for releasing the locked state.

In any event, it is then determined in a Step S3 whether or not operating dial 23 is set to automatic shifting mode (A). If so, then an automatic shifting process described below is performed in a Step S7. In any event, it is then determined in a Step S4 whether or not operating dial 23 is set to manual shifting mode (M). If so, then a manual shifting process described below is performed in a Step S8. In any event, it is then determined in a Step S5 whether or not another process has been selected. If so, then the selected process is performed in a Step S9. Processing then returns to Step S2.

Figure 6:
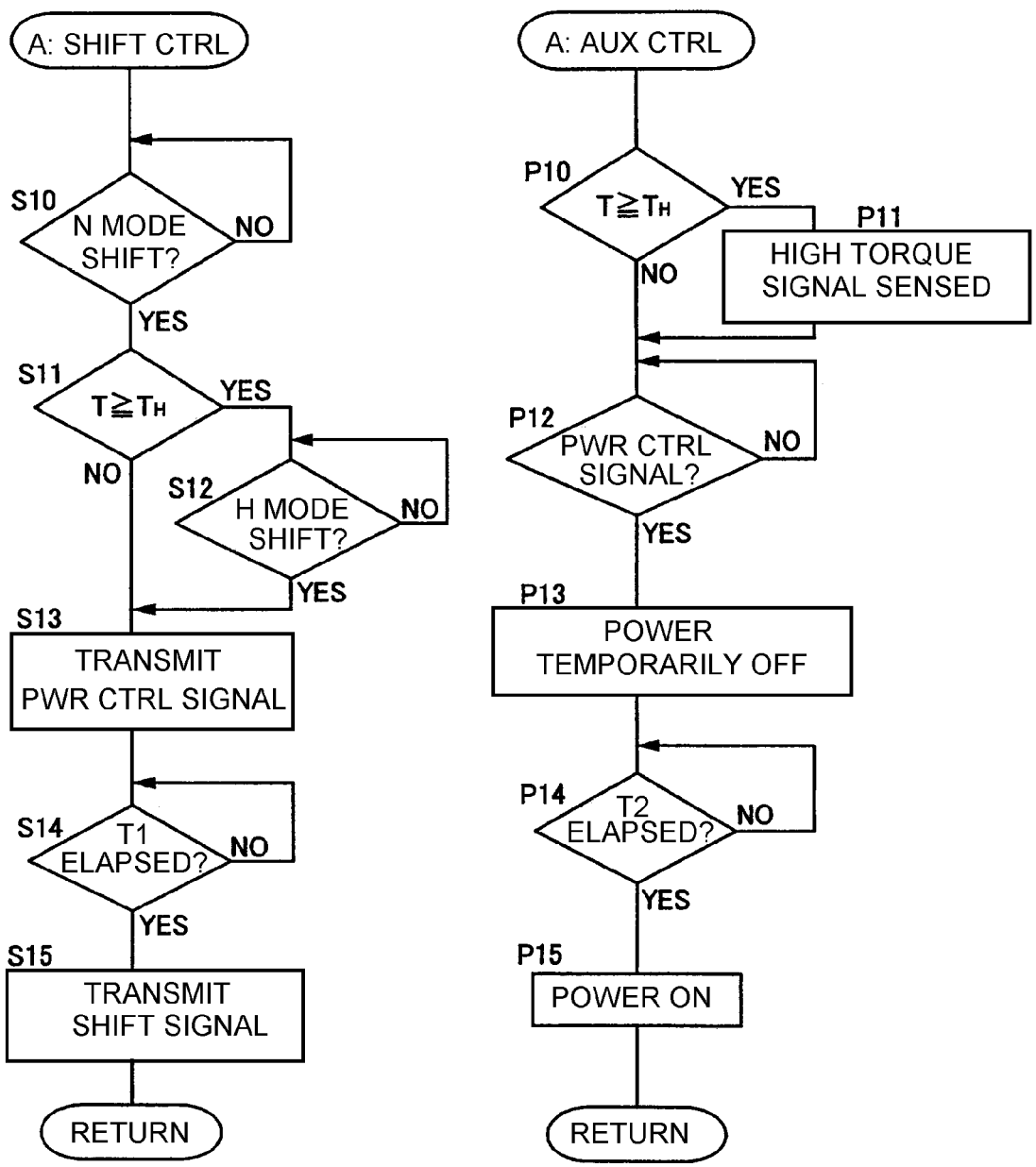
FIG. 6 is a pair of flow charts illustrating a particular embodiment of an automatic shift process.

FIG. 6 is a pair of flow charts illustrating a particular embodiment of the automatic shift process performed in Step S7 of FIG. 5. The flow chart on the left illustrates processing performed by shift control unit 25, whereas the flow chart on the right illustrates processing performed by auxiliary control unit 40. Initially, shift control unit 25 determines in a Step S10 whether or not the shifting conditions for normal (N) mode have been met. For example, if internal shifting hub 10 currently is in second gear as indicated by operating position sensor 26, shift control unit 25 refers to the normal torque mode table in FIG. 4 to determine whether or not the bicycle speed derived from the signals output by dynamo hub 12 is greater than or equal to 16 km/h. If not, then processing simply loops back, and the determination is made again.

Meanwhile, auxiliary control unit 40 regularly calculates the pedaling torque from torque sensor 41, and it is determined in a Step P10 whether or not the pedaling torque T is greater than or equal to a predetermined level $T_H$. If so, a signal indicating such (e.g., a high torque signal) is communicated to shift control unit 25. For example, a signal on a control line between shift control unit 25 and auxiliary control unit 40 may switch from a normal value of 3V to a high torque indicating value of 0V.

If it is determined by shift control unit 25 that the shifting conditions for normal mode have been met, it is then determined in a Step S11 whether or not the high torque indicating signal has been received from auxiliary control unit 40, thus indicating that pedaling torque is greater than or equal to $T_H$. If not, then processing moves to Step S13, and a power control signal that functions as a stress reducing signal is provided by shift control unit 25 to auxiliary control unit 40. For example, a signal on another control line between shift control unit 25 and auxiliary control unit 40 may switch from a normal value of 3V to a power control signal value of 0V.

If it is determined in Step S11 that a high torque indicating signal is received from auxiliary control unit 40, it is then determined in a Step S12 whether or not the shifting conditions for high torque (H) mode have been met. For example, if internal shifting hub 10 is in second gear as noted above, it is determined whether or not the bicycle speed is greater than or equal to 18.5 km/h. If not, then processing simply loops back, and the determination is made again. Otherwise, processing moves to Step S13, and the power control signal is provided by shift control unit 25 to auxiliary control unit 40.

Meanwhile auxiliary control unit 40 determines in a Step P12 whether the power control signal is being provided by shift control unit 25. If not, then processing simply loops back, and the determination is made again. When a power control signal is received from shift control unit 25, then processing moves to a Step P13, and the supply of power to auxiliary motor driver 43 is temporarily stopped for a predetermined time interval T2. More specifically, it is determined in a Step P14 whether or not time interval T2 has elapsed. If so, then the supply of power to auxiliary motor driver 43 is resumed in a Step P15.

Shift control unit 25 provides the power control signal to auxiliary control unit for a predetermined time interval T1 (e.g., 100 ms) in order to allow auxiliary control unit 40 sufficient time to stop power to auxiliary motor driver 43. Thus, it is determined in Step S14 whether or time T1 has elapsed. If so, processing moves to a Step S15, a shift signal is transmitted to motor driver 28, and motor driver 28 drives motor 29 to shift gears in internal shifting hub 10.

As a result for the above processing, power to auxiliary motor driver 43 is stopped for a time interval T2 from the receipt of the power control signal from shift control unit 25. This, in turn, reduces the stress applied to internal shifting hub 10 for a time that should be sufficient for shift control unit 25 to shift gears in internal shifting hub 10 more smoothly than is possible in conventional systems.

Figure 7:
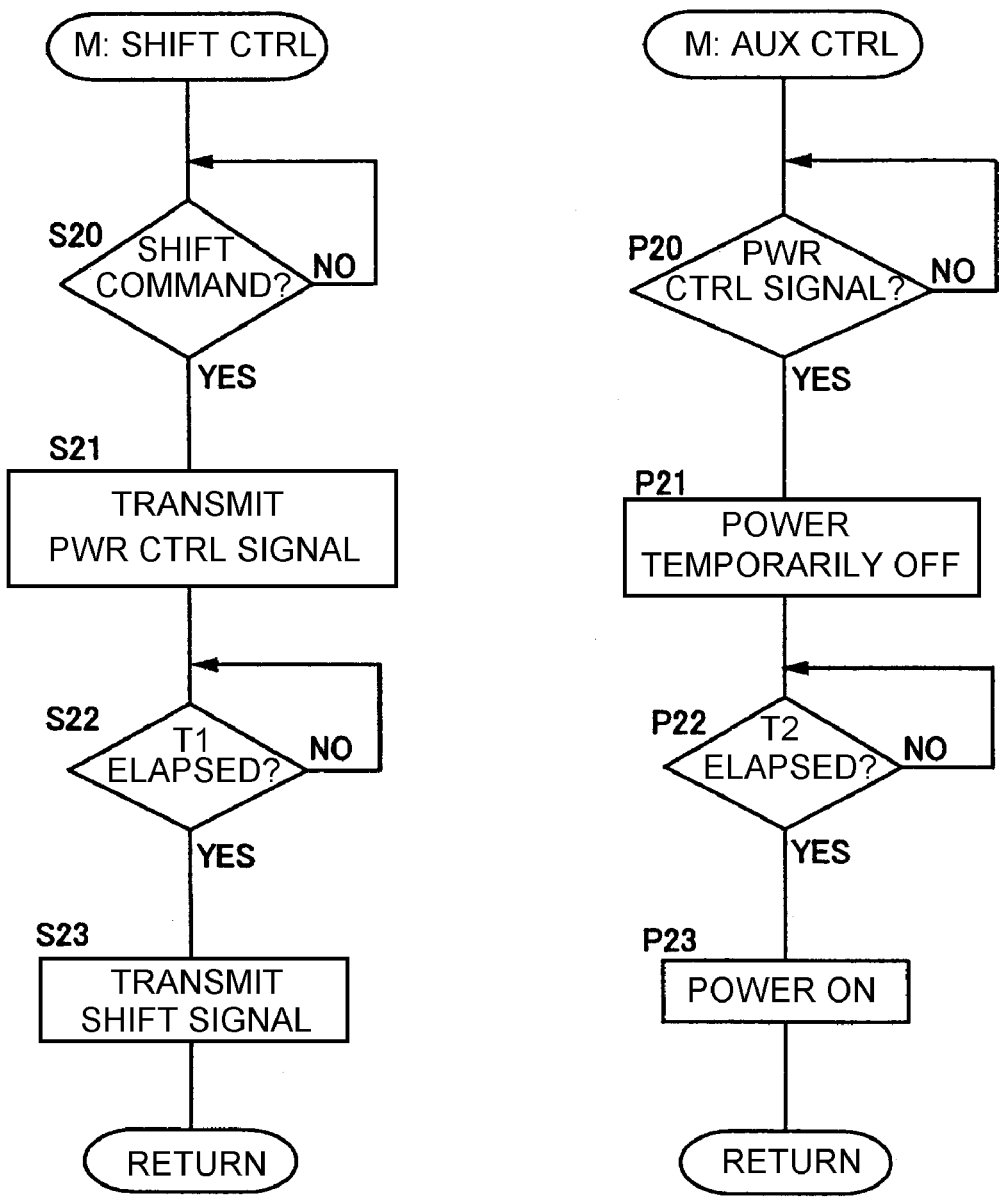
FIG. 7 is a pair of flow charts illustrating a particular embodiment of a manual shift process.

FIG. 7 is a pair of flow charts illustrating a particular embodiment of the manual shifting process performed in Step S8 of FIG. 5. As in the flow charts shown in FIG. 6, the flow chart on the left illustrates processing performed by shift control unit 25, and the flow chart on the right illustrates processing performed by auxiliary control unit 40. Shift control unit 25 initially determines in a Step S20 whether or not a shift command has been received (i.e., whether or not one of the operating buttons 21 and 22 has been manipulated). If not, then processing simply loops back, and the determination is made again. Otherwise, a power control signal is provided by shift control unit 25 to auxiliary control unit 40 in a Step S21. In this embodiment, the power control signal is the same as the power control signal provided in the automatic shifting process.

Meanwhile auxiliary control unit 40 determines in a Step P20 whether the power control signal is being provided by shift control unit 25. If not, then processing simply loops back, and the determination is made again. When the power control signal is received from shift control unit 25, then processing moves to a Step P21, and the supply of power to auxiliary motor driver 43 is temporarily stopped for a predetermined time interval T2, which may be the same as the time interval T2 provided in the automatic shifting process. More specifically, it is determined in a Step P22 whether or not time interval T2 has elapsed. If so, then the supply of power to auxiliary motor driver 43 is resumed in a Step P23.

Shift control unit 25 provides the power control signal to auxiliary control unit for a predetermined time interval T1, which may be the same as the time interval T1 provided in the automatic shifting process (e.g., 100 ms), in order to allow auxiliary control unit 40 sufficient time to stop power to auxiliary motor driver 43. Thus, it is determined in Step S22 whether or time T1 has elapsed. If so, processing moves to a Step S23, a shift signal is transmitted to motor driver 28, and motor driver 28 drives motor 29 to shift to the desired gear in internal shifting hub 10.

As in automatic shift processing, power to auxiliary motor driver 43 is stopped for a time interval T2 from the receipt of the power control signal from shift control unit 25. This, in turn, reduces the stress applied to internal shifting hub 10 for a time that should be sufficient for shift control unit 25 to shift gears in internal shifting hub 10 more smoothly than is possible in conventional systems.

Figure 8:
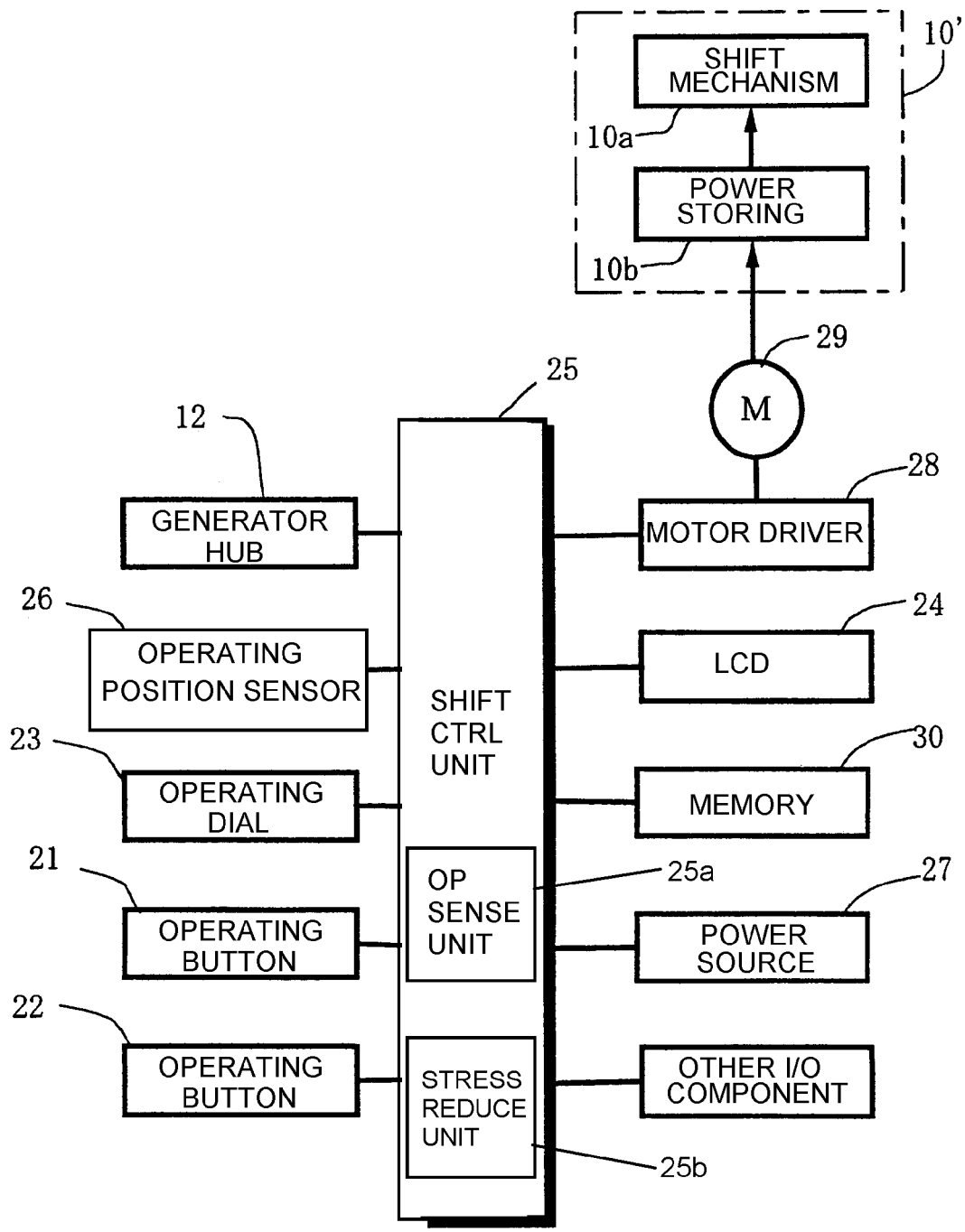
FIG. 8 is a schematic block diagram of another embodiment of a control system.

FIG. 8 is a schematic block diagram of a control system for an internal shifting hub 10''. In this embodiment, internal shifting hub 10'' is provided with a power storing mechanism 10b for storing power applied to a shift mechanism 10a of internal shifting hub 10'' from motor 29 when internal shifting hub 10'' is subjected to heavy stress. Power storing mechanism 10b stores the power received from shift motor 29 until the heavy stress is removed from internal shifting hub 10'', whereupon the stored power is used to perform the shifting operation. The other components are the same as in the previous embodiment and are numbered the same, so a detailed description of those components is omitted.

An example of a power storing mechanism 10b can be found in Japanese Patent Number 3107317, and more specifically in section [0011] and FIGS. 1, 4 and 8 of that patent. In that structure, one end of a coil spring is engaged with a rotor on the drive side of an internal shifting hub, and the other end of the coil spring is engaged with a rotor on the driven side of the internal shifting hub. When the rotor on the driven side of the internal shifting hub is subjected to stress such that the rotor rotates with great difficulty or not at all, the rotating force from the driving side is stored in the form of torsion in the coil spring. When the heavy load is reduced, the power stored in the coil spring rotates the rotor to complete the shifting operation.

Such a structure (e.g., a coil spring) could be applied in this embodiment between the rotor on the shift motor 29 and a rotor on the shift mechanism 10a. Thus, when rotating force is provided from the shift motor 29 while the components in the shift mechanism 10a are under a significant stress, the rotating force is temporarily stored in the coil spring. When the stress on the components in the shift mechanism 10a is reduced or eliminated, then the components in the shift mechanism 10a may be driven by the force stored in the coil spring to complete the shifting operation.

Figure 9:
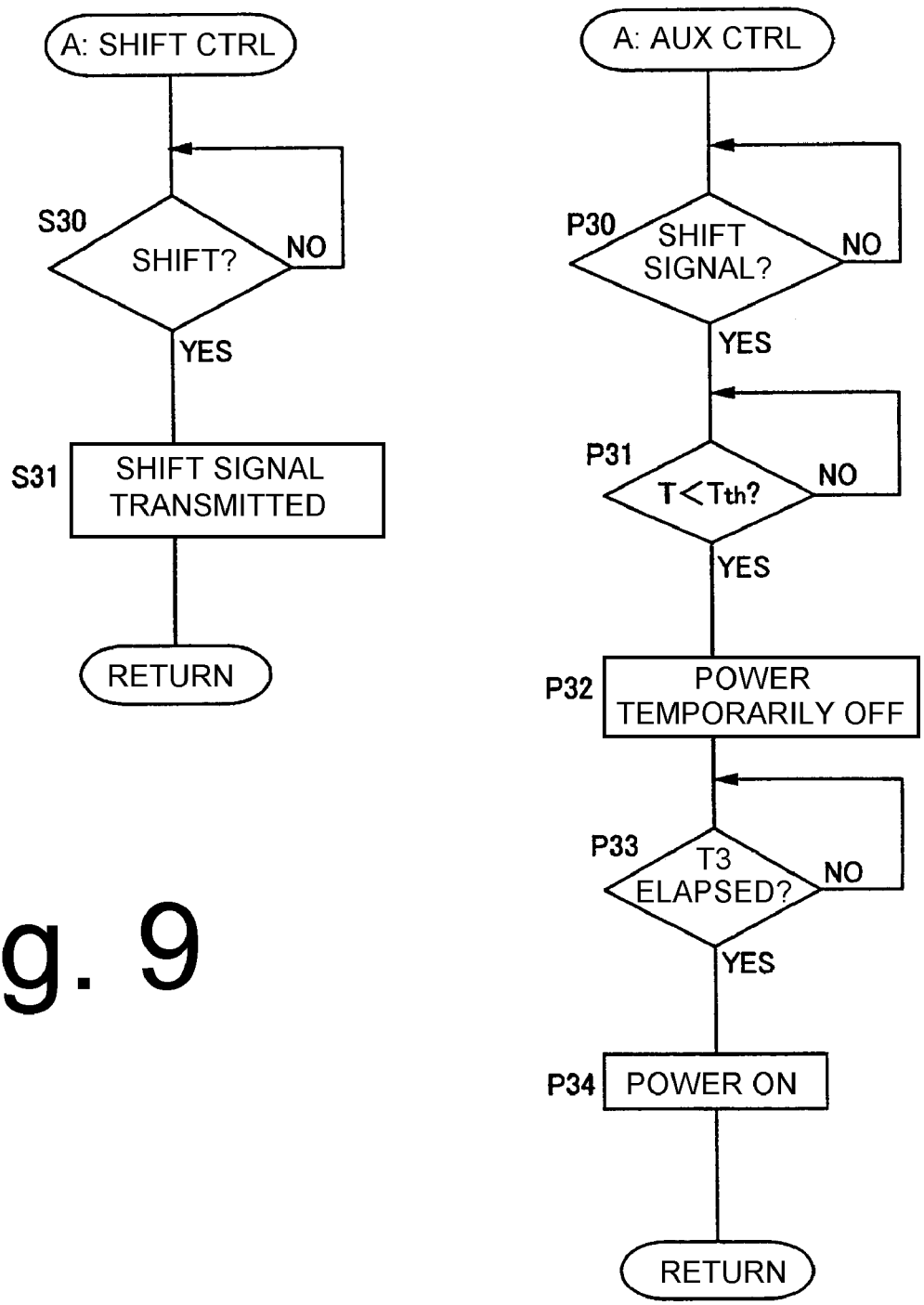
FIG. 9 is a pair of flow charts illustrating a particular embodiment of an automatic shift process for the embodiment shown in FIG. 8.

FIG. 9 is a pair of flow charts illustrating a particular embodiment of an automatic shift routine for this embodiment. The basic control operation of the shift control unit 25 is the same as in the flow chart in FIG. 5, and the parking process is the same as in the previous embodiment. The automatic shifting process and manual shifting process are different, but since the differences in these two are the same, only the automatic shifting process will be described below.

It is first determined in a Step S30 whether or not shifting conditions have been met (e.g., whether or not the bicycle speed has reached a certain velocity). If not, then processing simply loops back, and the determination is made again. Otherwise, a shift signal is sent to motor driver 28 and to auxiliary control unit 40 in a Step S31. Motor driver 28 drives shift motor 29 in response to the shift signal. In this case, if the pedal power is substantial, the load exerted on shift mechanism 10a may be such that the components therein may not be able to move properly. As a result, the rotating force from shift motor 29 is stored in the coil spring in the power storing mechanism 10b.

Meanwhile, auxiliary control unit 40 determines in a Step P30 whether or not a shift signal is being provided by shift control unit 25. If not, then processing simply loops back, and the determination is made again. When a shift signal is received from shift control unit 25, then processing moves to a Step P31, and it is determined whether or not the pedal torque T is below a predetermined threshold value $T_{th}$. If not, then processing simply loops back, and the determination is made again. Otherwise, when the stress on shift mechanism 10a is low, processing moves to a Step P32, and the supply of power to auxiliary motor driver 43 is temporarily stopped for a predetermined time interval T3. More specifically, it is determined in a Step P33 whether or not time interval T3 has elapsed. If so, then the supply of power to auxiliary motor driver 43 is resumed in a Step P34.

When the power to auxiliary motor driver 43 is stopped, the stress on the members in shift mechanism 10a is substantially reduced, thus allowing the parts to rotate or move smoothly. As a result, the force stored in the power storage mechanism 10b completes the shifting operation.

While the above is a description of various embodiments of inventive features, further modifications may be employed without departing from the spirit and scope of the present invention. For example, the teachings herein can be adapted to vehicles other than bicycles. While bicycle speed was sensed by means of pulses from a dynamo hub 12, bicycle speed could be sensed by means of pulses provided by a speed sensor comprising one or more magnets attached to a wheel and a reed switches mounted on the bicycle body such as the front fork. While bicycle velocity was used to determine when to shift the internal shifting hub in automatic shifting mode, crank RPM or some other parameter also may be used alone or in combination with bicycle velocity. In the case of crank RPM, a magnet may be attached to crank 18, a rotation sensor such as a reed switch may be mounted on frame body 2 to sense the passage of the magnet, and the crank RPM may be calculated accordingly.

While a three-speed internal shifting hub was described, neither the number of shifting speeds nor even the shifting device itself is so limited. While the above embodiments involved a shifting device controlled by a motor, the teachings herein could be adapted to a shifting device controlled by other types of actuators, such as solenoids, electrical, hydraulic, or pneumatic cylinders, etc.

While the power to auxiliary motor driver 43 was cut off to reduce the stress on the components of the internal shifting hub in the above embodiment, the power could simply be reduced by a selected amount. Also, while, the auxiliary power can be temporarily stopped or reduced during both downshifting and upshifting, it is also possible to temporarily stop the auxiliary power only during down shifting, since shifting is particularly difficult during down shifting. While a single predetermined pedal power threshold was used for control purposes, several pedal power thresholds could be used for control purposes, and different conditions could be used to select different thresholds.

The size, shape, location or orientation of the various components may be changed as desired. Components that are shown directly connected or contacting each other may have intermediate structures disposed between them. The functions of one element may be performed by two, and vice versa. The structures and functions of one embodiment may be adopted in another embodiment. It is not necessary for all advantages to be present in a particular embodiment at the same time. Every feature which is unique from the prior art, alone or in combination with other features, also should be considered a separate description of further inventions by the applicant, including the structural and/or functional concepts embodied by such feature(s). Thus, the scope of the invention should not be limited by the specific structures disclosed or the apparent initial focus or emphasis on a particular structure or feature.

The invention claimed is:

1. A control apparatus that facilitates the operation of a component that is subjected to stress from a stress-inducing component that includes a motion assisting unit that applies a motion assisting force to the component using a motor, wherein the apparatus comprises:
    an operation sensing unit that senses when the component should be operated;
    a stress reducing unit that provides a signal to operate the motor for reducing an amount of stress applied to the component from the motor when the operating sensing unit senses that the component should be operated; and
    a control unit that provides a signal for operating the component a predetermined event after the stress reducing unit provides the signal so that stress applied to the component from the motor is reduced at the time the component is operated.

2. The apparatus according to claim 1 wherein the component comprises a bicycle transmission shifting device.

3. The apparatus according to claim 2 wherein the component comprises an internal bicycle transmission shifting device.

4. The apparatus according to claim 1 wherein the predetermined event comprises a predetermined time.

5. The apparatus according to claim 1 further comprising a condition sensing unit operatively coupled to the operation sensing unit, wherein the operation sensing unit senses when the component should be operated in response to the condition sensing unit.

6. The apparatus according to claim 5 wherein the condition sensing unit comprises a torque sensor.

7. The apparatus according to claim 6 wherein the torque sensor comprises a bicycle pedal torque sensor.

8. The apparatus according to claim 1 wherein the operation sensing unit comprises a running condition sensing unit that senses a running condition of a bicycle.

9. The apparatus according to claim 8 wherein the running condition comprises bicycle speed.

10. The apparatus according to claim 8 wherein the running condition comprises bicycle crank speed.

11. The apparatus according to claim 8 wherein the component comprises a bicycle transmission shifting device.

12. The apparatus according to claim 11 wherein the running condition sensing unit determines whether the running condition has passed a shift threshold value.

13. The apparatus according to claim 12 wherein the running condition sensing unit determines whether the running condition has passed a downshift threshold value.

14. The apparatus according to claim 12 further comprising a bicycle condition sensing unit operatively coupled to the operation sensing unit, wherein the operation sensing unit senses when the bicycle transmission shifting device should be operated in response to the running condition sensing unit and the bicycle condition sensing unit.

15. The apparatus according to claim 14 wherein the operation sensing unit determines that the bicycle transmission shifting device should be operated when the running condition passes a first shift threshold value and a bicycle condition passes a first condition threshold value in a first direction, and wherein the operation sensing unit determines that the bicycle transmission shifting device should be operated when the running condition passes a second shift threshold value different from the first shift threshold value and the bicycle condition passes a second condition threshold value in a second direction different from the first direction.

16. The apparatus according to claim 15 wherein the second direction is opposite the first direction.

17. The apparatus according to claim 16 wherein the bicycle condition sensing unit comprises a torque sensor.

18. The apparatus according to claim 17 wherein the bicycle condition sensing unit comprises a pedal torque sensor.

19. The apparatus according to claim 11 wherein the operation sensing unit senses the operation of a manual transmission control device to determine that the bicycle transmission shifting device should be operated.

20. The apparatus according to claim 11 wherein the transmission shifting device comprises a power storing device for storing operating power for the transmission shifting device.

21. The apparatus according to claim 1 wherein the motor comprises an electrically operated motor, and wherein the stress reducing unit provides a signal for reducing an amount of electrical operating power to the motor when the component should be operated.

* * * * *